(12) United States Patent
Houatchanthara

(10) Patent No.: US 7,204,908 B2
(45) Date of Patent: Apr. 17, 2007

(54) HEAT-SHRINKABLE BANDING APPARATUS AND METHOD

(75) Inventor: Sainguen Houatchanthara, Raleigh, NC (US)

(73) Assignee: Axon Corporation, Raleigh, NC (US)

( * ) Notice: Subject to any disclaimer, the term of this patent is extended or adjusted under 35 U.S.C. 154(b) by 0 days.

(21) Appl. No.: 11/471,769

(22) Filed: Jun. 21, 2006

(65) Prior Publication Data

US 2006/0237115 A1    Oct. 26, 2006

Related U.S. Application Data

(62) Division of application No. 10/862,956, filed on Jun. 8, 2004, now Pat. No. 7,156,140.

(51) Int. Cl.
B32B 37/00 (2006.01)
B65B 9/04 (2006.01)

(52) U.S. Cl. .......................... 156/264; 156/85; 156/86; 156/556; 156/DIG. 14; 156/DIG. 12; 156/DIG. 26; 53/292; 53/399

(58) Field of Classification Search ................ 156/358, 156/363, 521, DIG. 14, DIG. 25, DIG. 36, 156/86, 85, 264; 493/102, 147, 343, 375, 493/379; 53/292, 399; 256/556
See application file for complete search history.

(56) References Cited

U.S. PATENT DOCUMENTS

| | | | |
|---|---|---|---|
| 3,888,067 A | 6/1975 | Cross et al. |
| 4,387,553 A | 6/1983 | Strub et al. |
| 4,914,893 A | 4/1990 | Strub et al. |
| 5,006,196 A | 4/1991 | Vandevoorde |
| 5,024,049 A | 6/1991 | Strub et al. |
| 5,060,367 A | 10/1991 | Vandevoorde |
| 5,305,578 A | 4/1994 | Menayan |
| 5,433,057 A | 7/1995 | Lerner et al. |
| 6,474,390 B1 | 11/2002 | Vandevoorde |
| 6,543,514 B2 | 4/2003 | Menayan |
| 2002/0096262 A1 | 7/2002 | Yang |
| 2003/0192639 A1 | 10/2003 | Mitchell et al. |

Primary Examiner—Linda Gray
(74) Attorney, Agent, or Firm—Thompson Hine LLP

(57) ABSTRACT

An apparatus and method is provided for forming a sleeve from a flat tube and applying the sleeve to a container. A length of flat tube is advanced from a supply to a position between a pair of movable grippers. The grippers are extended to contact and hold the tube, and a cutter severs the length of flat tube from the supply. A vacuum is applied to the grippers, and the grippers are retracted to open the cut flat tube into a round configuration. A second length of flat tube is advanced, pushing the open cut length tube onto a container that is being moved therebeneath on a conveyor.

16 Claims, 3 Drawing Sheets

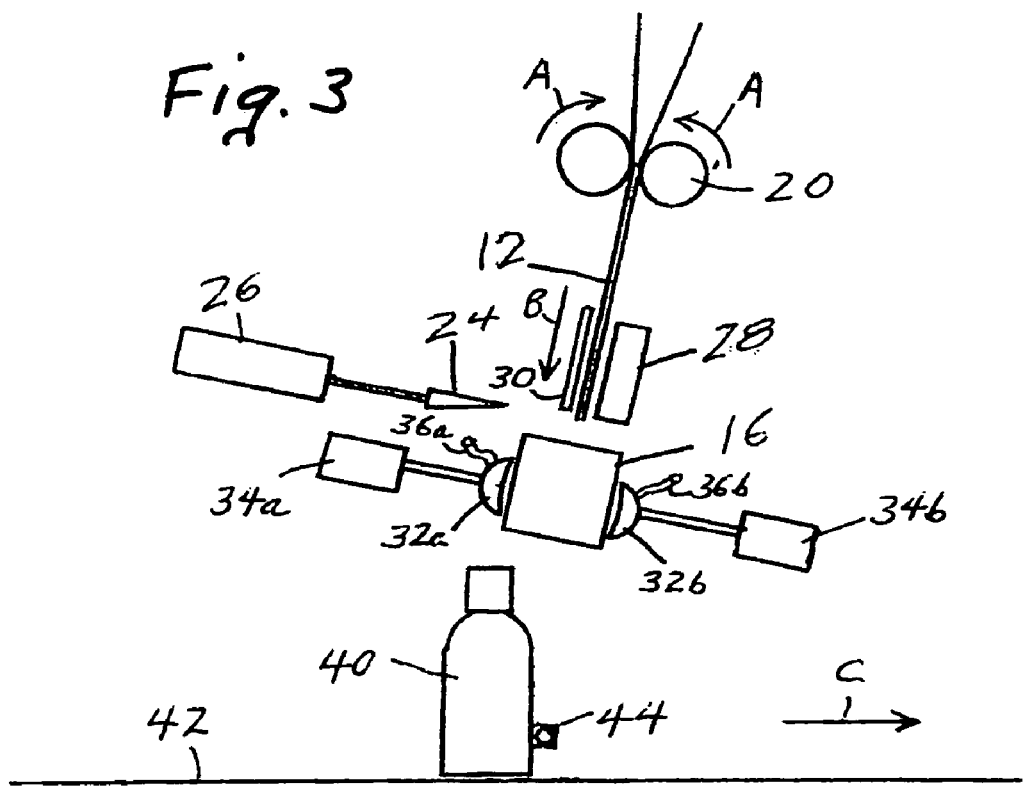
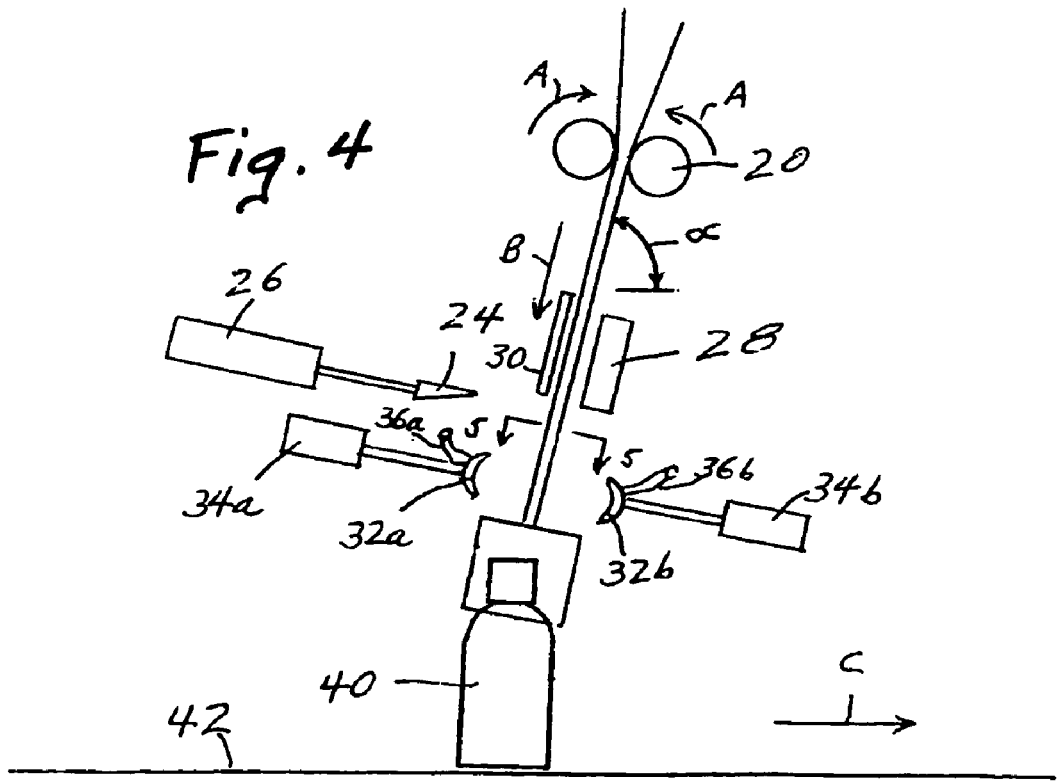

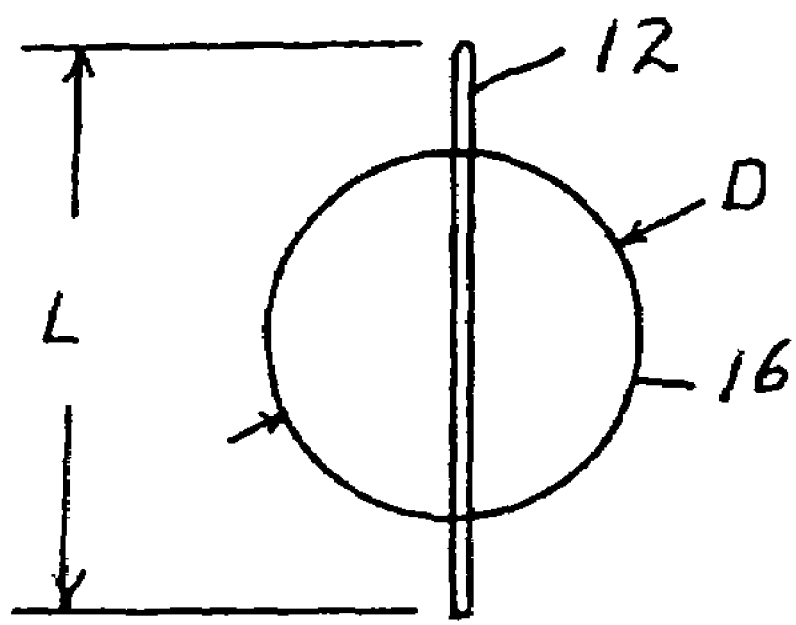

HEAT-SHRINKABLE BANDING APPARATUS AND METHOD

CROSS-REFERENCE TO RELATED APPLICATION

This application is a divisional of U.S. application Ser. No. 10/862,956, filed Jun. 8, 2004 now U.S. Pat. No. 7,156,140.

FIELD OF THE INVENTION

The present invention relates to the field of machinery and methods for the application of a circumferential band to a container, and more particularly to such machinery and methods in which the band is formed of a tubular film supplied in flat condition.

BACKGROUND OF THE INVENTION

Bands, and their counterparts, i.e. tubular labels, are used commonly for indicating the seal integrity of a container and for enhancing product packaging, respectively. In both the application of bands and tubular labels, a length of flat tubular thin-walled material is severed to form a cut sleeve, and the cut sleeve is placed over the container. If the purpose of the cut sleeve is to indicate whether the container has been opened after being initially sealed, the cut sleeve is relatively short and referred to as a band. If the cut sleeve is intended to cover a major portion of the container, the cut sleeve is relatively long and referred to as a label. Such bands and labels are typically formed from extruded or welded thermoplastic resin tubes, for example polyvinyl chloride (PVC) or polyethylene (PE). In many cases, the plastic tubes are pre-stretched radially so that they can be readily placed over a container and subsequently shrunk when subjected to heat.

A known machine for providing and applying bands to containers is described in U.S. Pat. No. 5,305,578 entitled Heat-Shrinkable Band Application Machine and incorporated herein by reference. The machine described in this '578 patent performs the desired functions by advancing a length of film tubing, grasping an end portion of the film tube with angularly oriented suction cups, cutting the length of film tube from the supply, expanding the angularly held cut sleeve into a position offset from the film tube supply and releasing the suction cups as a plunger descends to push the cut sleeve onto a container being moved by a conveyor.

SUMMARY OF THE INVENTION

The present invention provides an apparatus and method for mounting a band or label onto a container in a simplified and more efficient process. A selected length of flat film tube is advanced from a tubing supply, the length is held between a pair of opposed suction cups and severed from the tubing supply. The suction cups separate to open the cut length forming a rounded configuration in axial alignment with the tubing supply. When a product container is detected to be approaching a sleeve mounting position, the vacuum is released and a further length of flat film tube is advanced to push the opened cut sleeve onto the container. This process is repeated sequentially as additional containers are moved into position for receiving cut sleeves.

BRIEF DESCRIPTION OF THE DRAWINGS

The present invention is best understood in conjunction with the accompanying drawing figures in which like elements are identified by similar reference numerals and wherein:

FIGS. 1–4 are time sequenced views of the invention apparatus.

FIG. 1 is a diagrammatic side view of the banding apparatus of the present invention with a length of flat film tubing extended.

FIG. 2 is a diagrammatic side view of the banding apparatus of FIG. 1, showing the cutter blade and the grippers advanced.

FIG. 3 is a diagrammatic side view of the banding apparatus of FIG. 2 showing the cutter blade retracted and a cut sleeve opened.

FIG. 4 is a diagrammatic side view of the banding apparatus of FIG. 3 showing the opened cut sleeve pushed onto a container.

FIG. 5 is a view taken in the direction of line 5—5 of FIG. 4 showing the relationship between the flat tube and the open cut sleeve.

DETAILED DESCRIPTION OF THE PREFERRED EMBODIMENT

Figure 1:
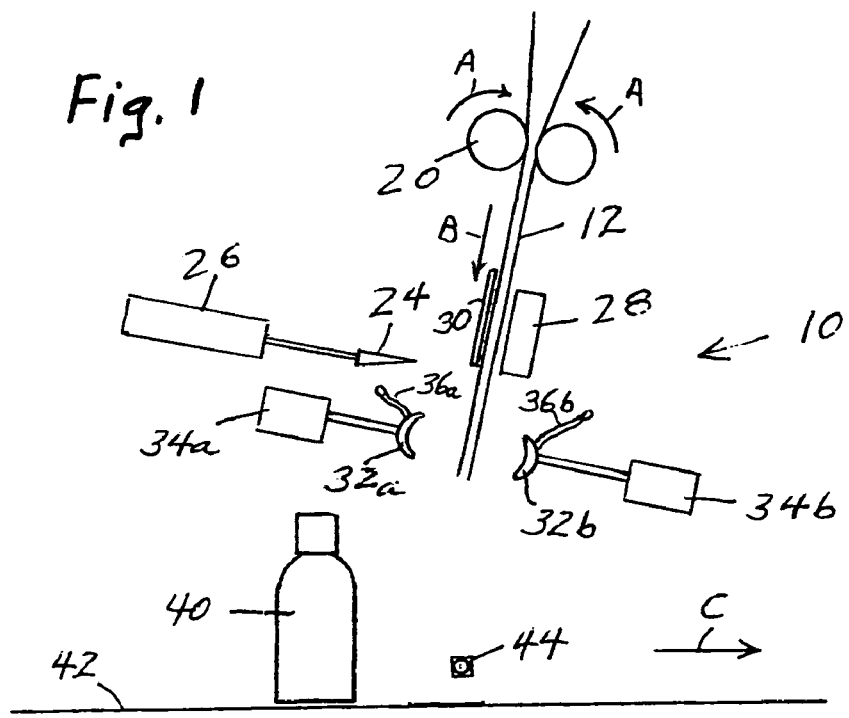

Referring now to FIG. 1, a diagrammatic side view illustrates an apparatus for mounting heat-shrinkable bands onto containers. Thin-wall film tubing 12 is provided from a supply reel (not shown) and passes between a pair of drive rollers 20 and past a cutter comprising movable blade 24, stationary shear block 28 and actuator 26. The angular orientation of film tube 12 with respect to a container 40 will be discussed below. In the section above drive rollers 20, film tube 12 is in flattened condition on the supply reel (not shown) and passes over a spreader, for example the spreader described in U.S. patent application Ser. No. 10/789,216 entitled Tubular Banding Apparatus And Method, incorporated herein by reference. Thus, film tube 12 is shown reducing from a wide aspect above drive rollers 20 to a narrow aspect at and below drive rollers 20, whereas in both conditions film tube 12 is flat in mutually perpendicular planes. Drive rollers 20 are rotated intermittently in the directions indicated by arrows A by a drive motor (not shown) to cause film tube 12 to move downward in the direction indicated by arrow B. The length of film tube 12 to be advanced by each operative cycle of drive rollers 20 is variable according to the process parameters. Film tube 12 is guided in a straight path from drive rollers 20 to a position between a pair of grippers 32a and 32b by being passed through a channel formed by shear block 28 and a guide 30 residing parallel to one another.

A first gripper 32a, for example a suction cup, is assembled to the end of a rod of a first actuator 34a, for example a pneumatic cylinder. A second gripper 32b is assembled to a second actuator 34b. Actuators 34a and 34b are mounted in axial alignment with one another with grippers 32a and 32b positioned respectively on either side of the path of film tube 12. Actuator 34a and actuator 34b are extendable to achieve contact between grippers 32a, 32b and film tube 12. The descriptive term "suction cup" is used here for explanatory reasons, and is not to be construed as a limitation on the scope of the invention. For a purpose to be described below, a first vacuum supply hose 36a is connected to gripper 32a and a second vacuum supply hose 36b is connected to gripper 32b.

A cutter for film tube 12 consists of movable blade 24 that is mounted on the cylinder rod of blade actuator 26 and a stationary blade, for example shear block 28. Blade 24 and shear block 28 are mounted on opposite sides of film tube 12 at a location below drive rollers 20 and above grippers 32a and 32b. When actuator 26 extends blade 24, blade 24 passes in shearing contact with shear block 28 to sever a length of film tube 12 from the film tubing supply.

An exemplary container 40, in a series of similar containers, is transported along conveyor 42 in the direction indicated by arrow C to pass a band applying point in alignment with the lower end of film tube 12. A sensor 44, for example a photosensitive cell, is mounted above conveyor 42 and below the end of film tube 12 in a position to sense the approach of container 40 to the band applying point at which a cut length of film tube 12 will be mounted onto container 40.

Figure 2:
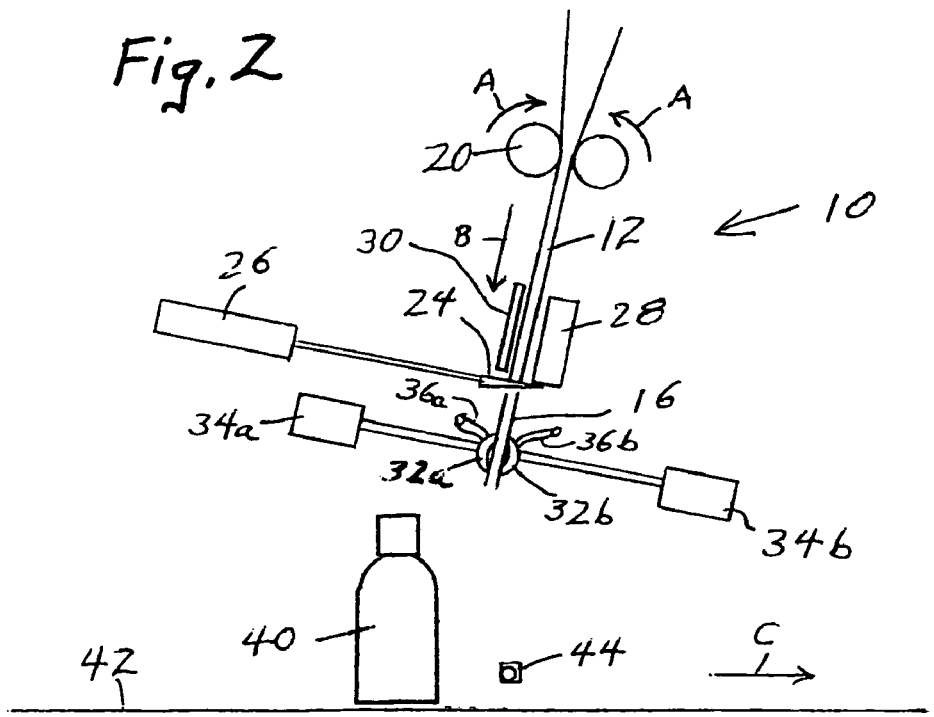

Referring now to FIG. 2, a selected length of film tube 12 is advanced and the lower end thereof is positioned between grippers 32a and 32b as described above in reference to FIG. 1. Grippers 32a and 32b extend and blade 24 cuts film tube 12 to form cut sleeve 16. In this manner, the lower end of film tube 12 is firmly held in position between grippers 32a and 32b while film tube 12 is cut from the tubing supply to form flat cut sleeve 16. Grippers 32a and 32b hold cut sleeve 16 in substantial alignment with film tube 12. During this time frame, container 40 has been moving incrementally along on conveyor 42 in the direction indicated by arrow C.

Referring now to FIG. 3, blade actuator 26 retracts to reposition blade 24 out of the downward path of film tube 12 and a negative pressure, or vacuum, is applied through hose 36a and hose 36b to enable grippers 32a and 32b to securely maintain their hold on opposed sides of cut sleeve 16. Next, actuators 34a and 34b are reversed, resulting in the separation of grippers 32a and 32b, opening cut sleeve 16 to a round, or near-round, configuration, as viewed from above (see FIG. 5). Grippers 32a and 32b move apart equally so as to maintain axial alignment between flat film tube 12 and open sleeve 16. Grippers 32a and 32b maintain their respective positions as exemplary container 40 has been moving still farther along on conveyor 42 to a position impinging the target area of sensor 44. The movements of film tube 12, grippers 32a, 32b and movable blade 24 are deactivated until a subsequent cycle is initiated. At the point that sensor 44 detects the position of container 40 on conveyor 42, sensor 44 transmits a signal to a controller (not shown). By computing the time at which container 40 will have moved from the position at which it was detected by sensor 44 to a position for receiving cut sleeve 16, the controller initiates a further cycle of the invention banding apparatus to occur, placing cut sleeve 16 onto container 40. Conveyor 42 moves container 40 along its path continuously without interruption.

Referring now to FIG. 4, the controller causes cut sleeve 16 to be assembled onto container 40 by causing drive rollers 20 to rotate a further increment in the direction of arrows A to extend an additional selected length of film tube 12 between guide 30 and shear block 28 to contact cut sleeve 16. The downward movement of film tube 12 releases open cut sleeve 16 from being suspended between grippers 32a and 32b, pushing cut sleeve 16 onto the neck of container 40 as conveyor 42 continuously moves container 40 therealong. Optionally, the vacuum applied to grippers 32a and 32b is deactivated in coordination with the movement of a subsequent length of flat tube 12. FIG. 5, a top view taken in the direction of line 5—5 of FIG. 4, clearly shows that the layflat width L of film tube 12 is greater than the diameter D of open cut sleeve 16. When film tube 12 is extended into contact with open cut sleeve 16, open cut sleeve 16 is moved onto container 40. Suction cups 32a and 32b remain in the position shown in FIG. 4, with extended film tube 12 therebetween for repeating the cutting, opening and assembling steps described above. Additional containers, similar to exemplary container 40, are conveyed in spaced apart relation by conveyor 42 in a series, each container triggering the apparatus of the invention to discharge a cut sleeve onto the triggering container, forming and opening another cut sleeve as described above.

The mechanism that comprises the invention, drive rollers 20, cutter 24, 26, 28 and grippers 32, 34, is oriented so that film tube 12, and more particularly cut sleeve 16, is presented at an angle a to the orientation of container 40 directed toward a band applying position. The band applying position coordinates the conveyed position of container 40 with the discharging of cut sleeve 16. This angular relation between film tube 12 and container 40 optimizes the accuracy and improves the speed of mounting cut sleeve 16 on container 40 by placing the right end (as illustrated) of cut sleeve 16 onto the leading edge of the container, allowing the left end to drop into place as container 40 continues to move in the direction of arrow C. Film tube 12 preferably resides at an angle a of less than 90° above horizontal, and more preferably between 65° and 85° above horizontal, most preferably about 75° above horizontal. In addition, actuators 34a and 34b reside in perpendicular relation to film tube 12.

Thus, the process in the invention employs the following steps:

1. Advance a first selected length of flat film tube from a supply of flat tubing;
2. Simultaneously extend a pair of opposed grippers to contact opposite sides of the film tube;
3. Cut the length of film tube from the supply to form a cut sleeve;
4. Actuate a vacuum source connected to the pair of grippers;
5. Retract the cutting mechanism out of the path of the film tube;
6. Retract the pair of grippers to open the cut sleeve;
7. Sense the approach of a container being conveyed to a band or label application location and transmit a signal in response thereto;
8. Release the vacuum on the suction cups; and
9. Advance a second selected length of flat film tube to push the cut sleeve onto the container.

While the description above discloses preferred embodiments of the present invention, it is contemplated that numerous variations and modifications of the invention are possible and are considered to be within the scope of the claims that follow.

What is claimed is:

1. A method for applying a band to a container, comprising the steps of:
    a. advancing a first selected length of flat film tube from a supply of flat tubing toward a band applying position
    b. extending a pair of opposed grippers to contact the film tube;
    c. extending a cutter to cut the selected length of flat film tube from the supply to form a sleeve;
    d. retracting the pair of grippers to open the flat cut sleeve;
    e. conveying a container to the band applying position; and
    f. extending a second selected length of flat film tube from the supply of tubing such that the second selected length of flat film tube contacts and pushes the open cut sleeve from the grippers and onto the container, the open cut sleeve initially contacting the container at an angle relative to an upright axis of the container.

2. The method described in claim 1, further comprising the steps of sensing the position of the container and transmitting a signal in response thereto.

3. The method described in claim 2, wherein the step of sensing the position of the container is performed prior to the step of extending a subsequent selected length of flat film tube.

4. The method described in claim 1, wherein the grippers comprise suction cups.

5. The method described in claim 1, further comprising the step of actuating a vacuum source connected to the pair of grippers.

6. The method described in claim 3, further comprising the step of releasing the vacuum connected to the pair of grippers.

7. The method described in claim 1, further comprising the step of retracting the cutter out of the path of the film tube.

8. The method described in claim 2, further comprising the steps of a controller receiving the signal from the sensor and initiating the step of extending the subsequent selected length of flat film tube placing the open cut sleeve onto the container.

9. A method for applying a band to a container, comprising the steps of:
   a. advancing a length of flat film tube from a supply of flat tubing toward a band applying position;
   b. cutting the length of flat film tube from the supply to form a flat cut sleeve;
   c. opening the flat cut sleeve to form an open cut sleeve;
   d. moving a container to and past the band applying position; and
   e. advancing a next length of flat film tube from the supply of tubing such that the next length of flat film tube contacts and pushes the open cut sleeve into position for placement onto the container, when the open cut sleeve initially contacts the container a longitudinal axis of the open cut sleeve is angled relative to an upright axis of the container.

10. The method described in claim 9, further comprising the steps of sensing the position of the container, transmitting a signal in response thereto and the advancing step is initiated responsive to the signal.

11. The method described in claim 9, wherein the opening step is performed by a pair of movable grippers disposed on opposite sides of a film tube path.

12. The method described in claim 9 wherein the cutting step is performed by moving a cutter across a path of the film tube.

13. A method for applying a band to a container, comprising the steps of:
   advancing a first length of flat film tube from a supply of flat tubing along a path toward a band applying position;
   cutting the first length of flat film tube;
   opening the first length of flat film tube;
   upon completion of the cutting and opening steps an open cut sleeve is formed;
   moving a container to and past the band applying position; and
   advancing a second length of flat film tube from the supply of tubing such that the second length of flat film tube contacts and pushes the open cut sleeve toward the container so that the open cut sleeve initially contacts the container at an angle relative to an upright axis of the container.

14. The method described in claim 13, further comprising the steps of sensing the position of the container, transmitting a signal in response thereto and the advancing step is initiated responsive to the signal.

15. The method described in claim 13, wherein the opening step is performed by a pair of movable grippers disposed on opposite sides of a film tube path.

16. The method described in claim 13 wherein the cutting step is performed by moving a cutter across a path of the film tube.

* * * * *